United States Patent [19]

Mattox

[11] 4,384,547
[45] May 24, 1983

[54] BIRDHOUSE CAGE

[76] Inventor: Robert G. Mattox, 4846 Radford, North Hollywood, Calif. 91607

[21] Appl. No.: 352,471

[22] Filed: Feb. 26, 1981

[51] Int. Cl.³ ............................................. A01K 31/06
[52] U.S. Cl. ................................................... 119/18
[58] Field of Search .................................... 119/18, 17

[56] References Cited

U.S. PATENT DOCUMENTS

| | | | |
|---|---|---|---|
| 2,190,119 | 2/1940 | Hoefler | 119/18 X |
| 2,789,531 | 4/1957 | Diefendorf | 119/18 X |
| 3,415,226 | 12/1968 | Cheung | 119/18 |
| 3,712,267 | 1/1973 | Moliterni | 119/18 |
| 4,235,196 | 11/1980 | Moliterni | 119/18 |

*Primary Examiner*—Hugh R. Chamblee
*Attorney, Agent, or Firm*—Vernon D. Beehler

[57] ABSTRACT

A cage for the housing of pet birds makes use of a relatively large enclosure on the floor of which is a removable litter tray. Near the top of the cage at each of two rear corners is a plastic container removably supported on brackets, one providing food and drinking water, the other providing bath water. A separate door in the side wall of the cage accommodates each container so that it can be individually removed for cleaning and replaced. A decorative tree-like perch of darkened material has an arm extending to a location in front of each container, the arm having an access hole in it in alignment with a matching hole in the wall of the container, in that manner to make the access holes readily apparent and available to bird occupants. The tree-like perch and other perches are suspended from appropriate walls of the cage for ready removal, cleaning and replacement.

8 Claims, 6 Drawing Figures

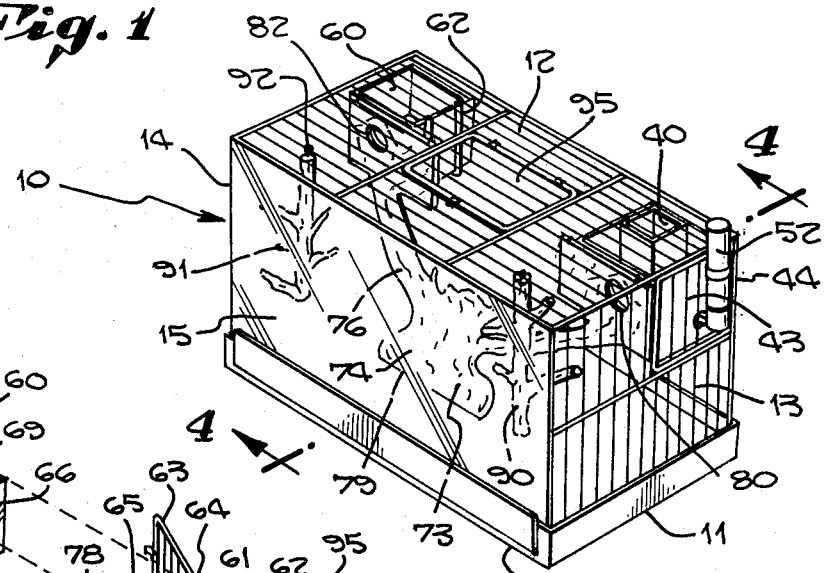
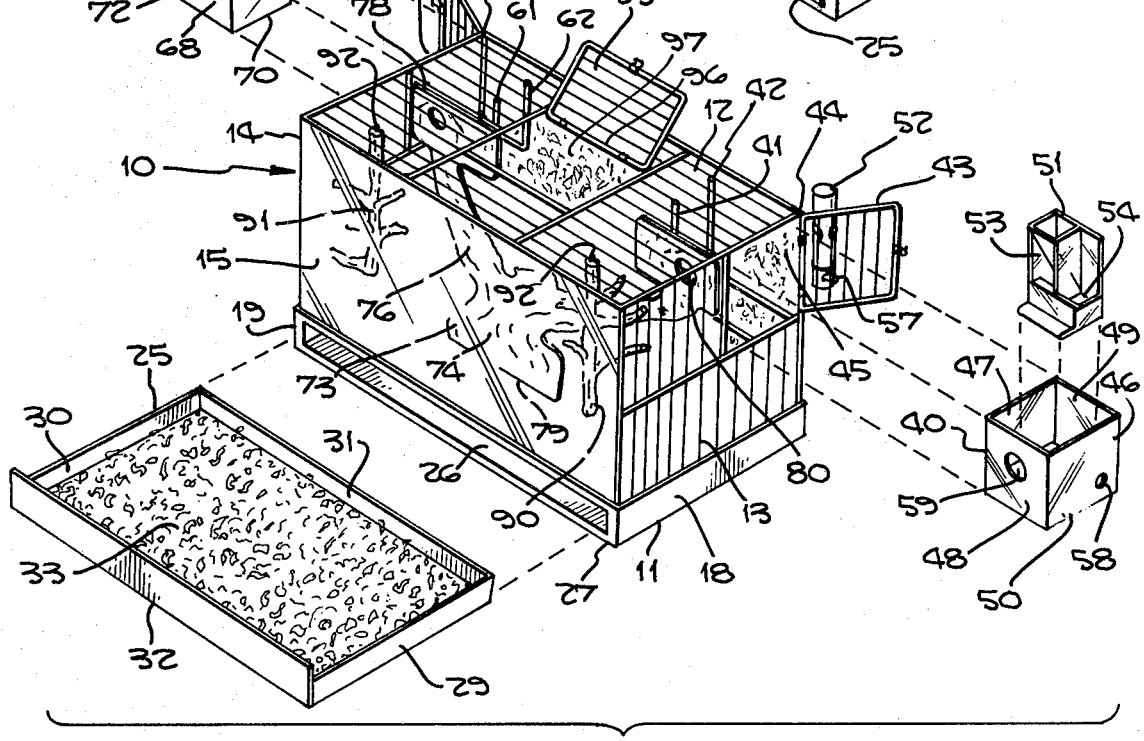
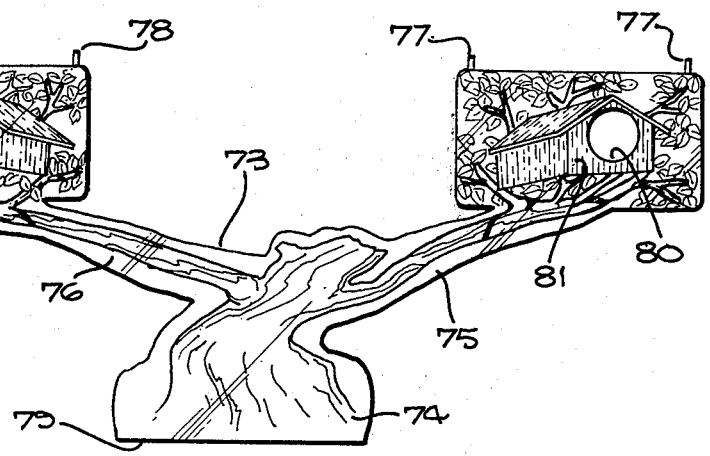

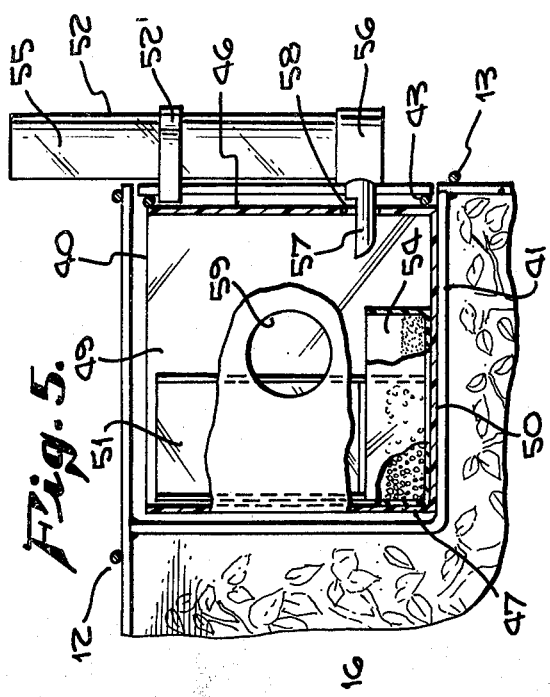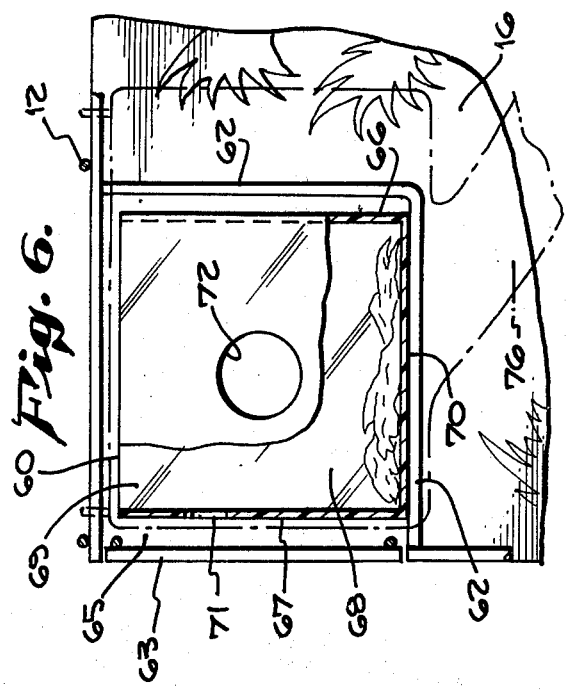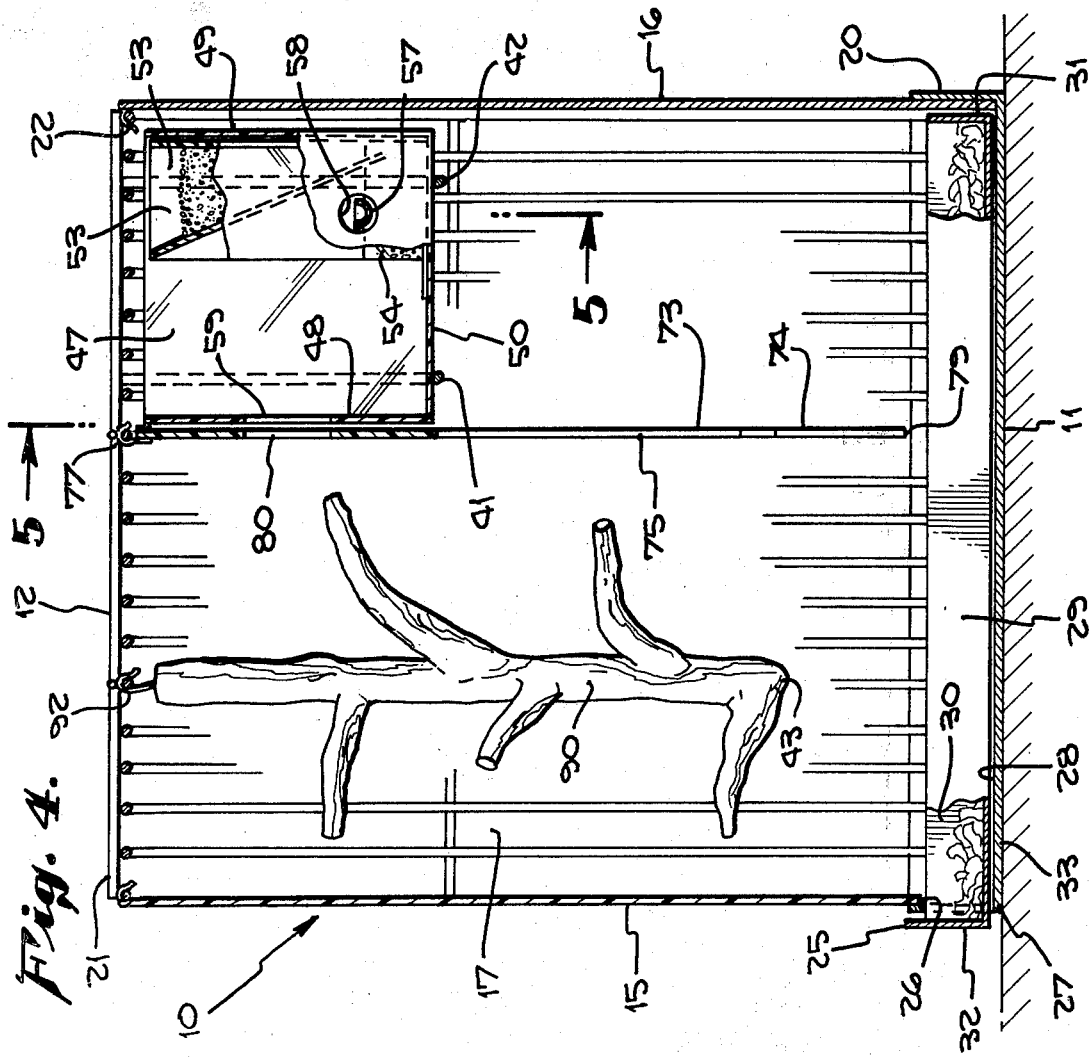

BIRDHOUSE CAGE

Cages for keeping one or more birds of various kinds have existed almost from time immemorial and have constantly prompted builders and owners to furnish the cages with various accommodations for the birds. Perches have been provided in virtually an infinite variety of forms. There have naturally been feeding trays and bathing containers of either a permanent kind or those removably placed on some horizontal support. Naturally also there has always been the constant need for removing litter. Frequently the litter or some form of collecting material at the bottom of the cage has been such as to require removal by hand. There are, of course, on other occasions removable trays for such litter. Permanently positioned and removably positioned feed containers have also challenged the ingenuity of cage builders.

To a very large extent the accessories made reference to have been directed predominantly to the accommodation of bird occupants. Whether having to do with feeding, bathing, removal of litter for cleanliness or mere decoration, relatively little attention has been directed to accommodation of the caretaker.

It is therefore among the objects of the invention to provide a new improved birdhouse cage such that those features always needed to accommodate the living habits of birds are constructed and arranged in such fashion that they can be quickly and readily serviced by the caretaker.

Another object of the invention is to provide a new improved birdhouse cage wherein the features needed to accommodate the living habits of birds are not only made in a manner to provide quick and easy servicing but also constructed in such fashion that they can be rearranged virtually at will.

Another object of the invention is to provide a new improved birdhouse cage directed to accommodate virtually all of the living habits of birds wherein those features are segregated for independent removal, servicing and cleaning but in a manner such that, although located most advantageously for the bird occupants, they are at the same time located for ready access and removal by the caretaker.

Still another object of the invention is to provide a new and improved birdhouse cage provided with separate containers for feeding, drinking, bathing, and perching, each container being independently mounted with respect to the others, each being readily accessible from the exterior, and each being so constructed and mounted that, although cooperating for the common accommodation of the occupants, can at the same time be independently handled and mounted, and to a degree shifted about at virtually any time without disturbing the bird occupants, attention being directed especially to providing for minimal maintenance and time saving service.

With these and other objects in view, the invention consists of the construction, arrangement and combination of the various parts of the device, serving as an example only of one or more embodiments of the invention, whereby the objects contemplated are obtained as hereinafter disclosed in the specification and drawings and pointed out in the appended claims.

FIG. 1 is a side perspective view of the birdhouse cage with interior components all in place.

FIG. 2 is a perspective exploded view showing most of the interior components at a location removed from the main enclosure.

FIG. 3 is a front elevational view of one of the interior components.

FIG. 4 is a cross-sectional view on the line 4—4 of FIG. 1.

FIG. 5 is a fragmentary longitudinal sectional view on the line 5—5 of FIG. 4.

FIG. 6 is a fragmentary longitudinal sectional view at the side of the cage opposite from that of FIG. 5.

In an embodiment of the invention chosen for the purpose of illustration, there is shown a birdhouse cage indicated generally by the reference character 10 consisting of a bottom wall 11, a top wall 12, respective right and left side walls 13 and 14, a front wall 15 and a rear wall 16. The walls acting together form a general, relatively large enclosure 17. To provide adequate rigidity the bottom wall 11 includes flanges 18 and 19 at the right and left side and a connecting flange 20 at the rear. The right and left side walls 13 and 14 are rigidly attached to the respective flanges 18 and 19, and are firmly joined to the top wall 12 at the corresponding corners. The side walls and top walls are preferably of barred mesh. For a clear vision of the entire enclosure 17, the front wall 15 may be of transparent plastic sheet material with hooks 21 at the top for attachment to the forewardmost portion of the top wall. Similarly, the rear wall 16 may be provided with hooks 22 for attachment to the rearmost portion of the top wall 12 in a manner permitting removal and replacement. For an attractive effect and to provide perspective the rearmost wall may be a picture wall consisting of scenery, trees, leaves or comparable decoration.

To improve the ease of servicing the enclosure for cleanliness and cleaning there is provided a litter tray 25 of a size adapted to slide freely through an opening 26 in a front flange 27 of the bottom portion of the cage. The litter tray has its own bottom 28, side walls 29 and 30, a rear wall 31 and front wall 32. The size of the litter tray is made such that it substantially occupies the entire area at the bottom of the cage. Such a litter tray is customarily covered with a composition 33, a composition which may consist of wood chips and shavings together with varied herbs.

In the upper right hand rear corner of the cage there is located an auxiliary container 40. For mounting the auxiliary container there are provided two supports 41 and 42 anchored at opposite upper and lower ends to adjacent wall portions of the respective top and side walls 12 and 15. A door 43 hinged at the rear edge 44 to the cage swings open to provide access to the enclosure 17 through a passage 45. The passage 45 is to accommodate removal and replacement of the auxiliary container 40.

The auxiliary container in turn consists of side walls 46 and 47, a front wall 48, a rear wall 49 and a bottom wall 50, no top wall being provided. The auxiliary container 40 is primarily for containment and retention of a feed dispenser 51 and a drinking water container 52. The feed dispenser 51 includes a hopper 53, primarily for seeds, and a feed tray 54 open at the top for access by the bird occupants. The feed dispenser 51 has a relatively broad, flat bottom so as to rest securely on the bottom wall 50 of the auxiliary container 40.

It is of interest to note that the drinking water container 52 is mounted upon the door 43, as appearing in FIG. 5 by a clip 52'. Drinking water is contained in a relatively tall column 55 which rests in a bracket 56 from which a water dispenser 57 extends from the right toward the left as viewed in FIG. 5. There is a hole 58 in the side wall 46 of the auxiliary container 40 which is adapted to receive the dispenser 57 when the door is closed, bringing the drinking water container 52 into position.

To provide access for bird occupants to the auxiliary dispenser 40 from the enclosure 17 of the cage there is provided an access opening 59 in the front wall 48.

At the opposite upper rear corner of the birdhouse cage 10 is a second auxiliary container 60, primarily for containing bath water for the bird occupants. On this occasion there are also provided supports 61 and 62, upper ends of which are anchored to the top wall 12 of the cage and lower ends of which are anchored to the left side wall 14 of the cage. Here also there is provided a door 63, its rear edge 64 hinged to the side wall 14 of the cage. The door swings to open and close a passage 65 for removal and replacement of the auxiliary container 60.

In this instance also the auxiliary container 60 consists of side walls 66 and 67, a front wall 68, rear wall 69, and bottom wall 70, there not being provided any top wall. In the side wall 67 is a hole 71 so that bath water can be replenished within the auxiliary container 60. In the front wall 68 is an access opening 72 for giving the bird occupants of the cage 10 access to the interior of the auxiliary container 60.

To enhance the appearance of the interior of the enclosure 17 there is provided a piece of sheet material depicting a tree 73 having a trunk 74 and branches 75 and 76. At the uppermost end of the branch 75 are hooks 77 for suspending the branch at an appropriate location on the top wall 12 of the cage. Similar hooks 78 serve to suspend the upper end of the branch 76, also upon the top wall 12. By suspending the tree as described, a lowermost edge 79 is suspended entirely clear of the top of the litter tray 25.

Near the upper end of the branch 75 there is an access opening 80 in substantial alignment with the access opening 59 of the front wall 48 of the auxiliary container 40. It is important that the upper end of the branch 75 be of relatively dark material in order to accent location of the access opening 80 so that the bird occupants will know where this opening is. Just by way of example, a birdhouse 81 may be depicted on the branch 75.

In a similar manner, there is provided an access opening 82 for the branch 76. Here again, the access opening 82 is in substantial alignment with the access opening 72 of the auxiliary container 60. A simulated birdhouse 83 at this location may also provide the necessary darkened area around the access opening 82 to accentuate its location.

To additionally furnish the interior of the enclosure 17 in a natural fashion there are provided perches 90 and 91. The perches, as for example the perch 90, can be virtually of any chosen design providing a main trunk and scattered branches. Of consequence is the hook 92 at the top of the perch arranged in a fashion such that the perch can be suspended at an appropriate location from the top wall 12 of the cage 10. Suspending the perch in the manner described and shown suspends a lowermost end 93 of the trunk of the perch at a location above the litter tray 25 so that the litter tray may be removed and replaced at will without it being necessary to disturb the perch. The perch 91 is similarly suspended by an appropriate hook 92 so that it also may remain in position. As shown advantageously in FIG. 4 and as previously noted the lowermost edge 79 of the tree 73 is also suspended clear, hence there is no impediment at any time to the removal and replacement of the litter tray 25. Because the perches have a suspended mounting as shown and described, they can be relocated wherever the owner might wish, within the enclosure 17. Suspending the tree 73 also permits adjustment so that the access openings can always be located in a proper position. This also makes possible removal of the tree and replacement of a comparable tree of somewhat different design should that be the desire. Further still, removability of the rear wall 16 makes it possible to substitute a different rear wall with a different scene should variety be of consequence, especially for selling purposes. Further still, although front wall 15 has been depicted as one of transparent or translucent sheet material, this also can be removed and replaced either with a different front wall or if preferred with a front wall constructed of mesh.

For still an additional convenience in servicing there is provided a door 95 having its rear edge 96 hinged to an appropriate portion of the top wall 12 so that it can be swung to either clear or close a top opening 97 of the cage.

As can be noted from the structural relationship of the various accessories heretofore described any one of the containers or the litter tray can be removed individually at will for cleaning and replacement without need for disturbing otherwise the interior of the cage. Accessory components can be shifted at will or replaced to vary the appearance, it being unnecessary to otherwise disturb the overall assembly of the birdhouse cage. The same replacement is also possible for front and rear walls of the cage itself. Because it is impossible to readily entirely remove either or both of the auxiliary containers, these components can be washed and cleaned and ultimately replaced without disturbing the bird occupants. Feed can be replenished, drinking water replenished and bath water added at will, and at any time, without disturbing any of the other components and without need for opening the cage with the risk of having the bird occupants escape. The result is one which provides for an interchangeable scenic picture while at the same time providing for the living habits of the bird occupants with a cage which need not be messy and which requires minimal maintenance at a substantial saving of time.

While particular embodiments of the present invention have been shown and described, it will be obvious to those skilled in the art that changes and modifications may be made without departing from the invention in its broader aspects, and therefore, the aims of the appended claims is to cover all such changes and modifications as fall within the true spirit of this invention.

Having described the invention, what is claimed as new in support of Letters Patent is as follows:

1. A cage for the housing of birds comprising a relatively large enclosure having side, top and bottom walls, a litter tray having a removable mounting adjacent the bottom wall for removal and replacement of said tray, an auxiliary container comprising substantially translucent panels, said panels comprising front and rear panels and side panels respectively intermediate said front and rear panels, the size of said auxiliary container being several times smaller than the size of said enclosure, and a feed container removably received in said auxiliary container, said feed container having front and side areas of width less than the width of the front and side panels of said auxiliary container, a fixed support means on a wall portion of said cage within said enclosure, said auxiliary container having a removable mounting on said support means and within said enclosure at a location spaced above said bottom wall and free of said litter tray, a passage in one of said walls adjacent said support means and remote from said litter tray for removal and replacement only of the auxiliary container and contents, a door for the passage movably mounted relative to said one of said walls for opening and closing said passage, one wall of said auxiliary container having a bird access way therein in communication with and facing said enclosure.

2. A cage as in claim 1 wherein said feed dispenser has a removable mounting within said auxiliary container.

3. A cage as in claim 1 wherein there is a scenery member having laterally extending substantially opaque projection means and a suspending fixture adjacent the top of the scenery member in removable engagement with the top wall of said cage whereby to suspend said scenery member clear of said litter tray, and a bird access way in said projection means at a location coincident with the bird access way of said auxiliary container.

4. A cage as in claim 1 wherein there are two auxiliary containers on respective opposite sides of said cage, a support for each said auxiliary container providing a removable mounting for each respective auxiliary container and a passage for each auxiliary container in a respective side wall portion of the cage, each said passage having a door movably mounted on the respective side wall portion for removal and replacement of the respective auxiliary container.

5. A cage as in claim 4 wherein one of said auxiliary containers has an impervious bottom portion for containment of a mass of bath water.

6. A cage for the housing of birds comprising a relatively large enclosure having side, top and bottom walls, a litter tray having a removable mounting adjacent the bottom wall for removal and replacement of said tray, an auxiliary container comprising substantially translucent panels, the size of said auxiliary container being several times smaller than the size of said enclosure, and a feed container removably received in said auxiliary container, a support means on a wall portion of said cage, said auxiliary container having a removable mounting on said support means and within said enclosure at a location spaced above said bottom wall and said litter tray, a passage in one of said walls adjacent said support means for removal and replacement of the auxiliary container, a door for the passage movably mounted relative to said one of said walls for opening and closing said passage, one side wall of said auxiliary container having an access opening therein in communication with said enclosure, said passage being in a side wall of the cage and said door for said passage being movably mounted on said side wall of the cage, a drinking water container on said door having a laterally projecting dispenser, and means forming a hole in a side wall of said auxiliary container at a location coincident with said dispenser and adapted to removably receive said dispenser when said door is in a closed position.

7. A cage for the housing of birds comprising a relatively large enclosure having side, top and bottom walls, a litter tray having a removable mounting adjacent the bottom wall for removal and replacement of said tray, an auxiliary container comprising substantially translucent panels, the size of said auxiliary container being several times smaller than the size of said enclosure, and a feed container removably received in said auxiliary container, a support means on a wall portion of said cage, said auxiliary container having a removable mounting on said support means and within said enclosure at a location spaced above said bottom wall and said litter tray, a passage in one of said walls adjacent said support means for removal and replacement of the auxiliary container, a door for the passage movably mounted relative to said one of said walls for opening and closing said passage, one side wall of said auxiliary container having an access opening therein in communication with said enclosure, a fixture having a removable mounting in said enclosure at a location clear of said litter tray, an arm on said fixture extending to a position adjacent the access opening of said auxiliary container, the end of said arm being at a location adjacent said access opening and being of opaque character, and means forming an auxiliary access opening in said end of the arm, said access openings being in substantially horizontal alignment with each other.

8. A cage as in claim 7 wherein there is a removable suspending connection between said fixture and a portion of one of the walls of said cage.

* * * * *